(12) United States Patent
Jacobs et al.

(10) Patent No.: US 8,688,529 B2
(45) Date of Patent: Apr. 1, 2014

(54) SYSTEM AND METHOD FOR ASSOCIATING REQUESTS WITH POTENTIAL RESPONDENTS TO SAID REQUESTS

(76) Inventors: Thomas M. Jacobs, Dayton, OH (US);
Clifford J. Radziewicz, Hillsborough, NJ (US)

(*) Notice: Subject to any disclaimer, the term of this patent is extended or adjusted under 35 U.S.C. 154(b) by 2112 days.

(21) Appl. No.: 11/036,200

(22) Filed: Jan. 14, 2005

(65) Prior Publication Data

US 2005/0203806 A1   Sep. 15, 2005

Related U.S. Application Data

(60) Provisional application No. 60/537,389, filed on Jan. 17, 2004.

(51) Int. Cl.
*G06Q 30/00* (2012.01)

(52) U.S. Cl.
USPC .......................................................... 705/26.1

(58) Field of Classification Search
USPC ........................................... 705/26, 27, 26.1
See application file for complete search history.

(56) References Cited

U.S. PATENT DOCUMENTS

| | | | |
|---|---|---|---|
| 2005/0097000 A1* | 5/2005 | Freishtat et al. | 705/26 |
| 2006/0031138 A1* | 2/2006 | Todd | 705/26 |
| 2006/0173775 A1* | 8/2006 | Cullen et al. | 705/37 |

* cited by examiner

*Primary Examiner* — Mila Airapetian
(74) *Attorney, Agent, or Firm* — Ward & Zinna, LLC (57) ABSTRACT

A system for associating an electronic request with at least one supplier, including a storage device for storing information regarding a plurality of suppliers of goods or services; a receiver for receiving information regarding an electronic request; a processor for processing information regarding the electronic request and creating an electronic venue; a transmitter for transmitting information regarding the electronic request and the electronic venue to a first supplier if the system determines that the first supplier is authorized to access the electronic venue and the electronic request, and also for transmitting information regarding the electronic request and the electronic venue to a second supplier if the system determines that the second supplier is authorized to access the electronic venue.

35 Claims, 7 Drawing Sheets

SYSTEM AND METHOD FOR ASSOCIATING REQUESTS WITH POTENTIAL RESPONDENTS TO SAID REQUESTS

CROSS REFERENCE TO RELATED APPLICATIONS

This application claims the priority to provisional application Ser. No. 60/537,389, filed Jan. 17, 2004.

BACKGROUND OF THE INVENTION

The present invention relates generally to systems for associating requests with potential respondents to those requests, such as for use in potential purchasing of goods and/or services, knowledge-based inquiries, and matching common interest groups.

SUMMARY OF THE INVENTION

The present invention contemplates a system for associating requests with potential respondents to those requests including: (i) a system user originating a request; (ii) associating at least one category designation with said request, the category designation selected from a predetermined list of category designations; and (iii) providing at least one potential respondent with access to said request based on said at least one category designation, each potential respondent having self-selected said at least one category designation for association with itself.

In a preferred embodiment, the system of the present invention contemplates associating electronic requests for the purchase of goods or services or both with potential suppliers of those goods or services or both including: (i) a system user originating a request for purchase of goods or services or both; (ii) associating at least one category designation with said request, the category designation selected from a predetermined list of category designations; and (iii) providing at least one potential supplier of said goods or services or both with access to said request based on said at least one category designation, each potential supplier having self-selected said at least one category designation for association with itself. The system of the present invention may facilitate commerce over data networks, including the Internet, by matching potential buyers with potential suppliers.

BRIEF DESCRIPTION OF THE DRAWINGS

A further understanding of the present invention can be obtained by reference to a preferred embodiment as set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

For a more complete understanding of the present invention, reference is now made to the following drawings in which.

DESCRIPTION OF THE PREFERRED EMBODIMENTS

As required, a detailed illustrative embodiment of the present invention is disclosed herein. However, techniques, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for the purposes of disclosure and to provide a basis for the claims herein, which define the scope of the present invention. The following presents a detailed description of a preferred embodiment (as well as some alternative embodiments) of the present invention.

The present invention contemplates a system for associating requests with potential respondents to those requests and comprises: (i) a user originating a request; (ii) associating at least one category designation with said request, the category designation selected from a predetermined list of category designations; and (iii) providing at least one potential respondent with access to said request based on said at least one category designation, each potential respondent having selected said at least one category designation for association with itself.

Preferably, the system user selects the category designation (s) for association with the request. As used herein, the term "system" may include a method, a software system, a software method, a computer-automated system, a computer-automated method, etc. As also used herein, the term "request" is intended to include a communication that explicitly or implicitly asks for or solicits something to be given or done in response to the request and includes, but is not limited to, requests to purchase, requests for proposal, requests for quotations, and requests for information.

In a preferred embodiment, the system of the present invention contemplates associating requests for the purchase of goods or services or both with potential suppliers of those goods or services or both and comprises: (i) a system user originating a request for purchase of goods or services or both; (ii) associating at least one category designation with said request selected by the user from a predetermined list of category designations; and (iii) providing at least one potential supplier of said goods or services or both with access to said request based on said at least one category designation, each potential supplier having self-selected said at least one category designation for association with itself.

The system of the present invention provides individuals and entities initiating requests, such as communications including requests, with enhanced capability for communicating those requests to potential respondents to those requests that have expressed an interest in some characteristic of the request, such as a category designation, thereby improving the likelihood of a response to the request. For example, the system provides buyers of goods and services with the opportunity to easily distribute their specific purchase requirements in their own defined content and format to suppliers, such as suppliers of those goods and services. In addition, the purpose of the system of the present invention is to provide suppliers of goods and services with targeted, active, and current information from buyers of those goods and services that are ready to buy those goods and services. Suppliers are themselves qualified with respect to the category designation subject matter because they have each self-selected that category designation as being of interest to themselves.

In a preferred embodiment of the system of the present invention, a potential buyer who is prepared to make a purchase of goods or services (or both) or is contemplating such a purchase creates a request for purchase in electronic form by posting to the system a communication that includes: (i) a user-defined request for purchase content; (ii) at least one category designation selected from a pre-determined list of category designations that classify goods and services. This list of category designations may be pre-defined. In an alternative embodiment, the category designation or designations to be associated with the request may also be suggested or selected by the system via an analysis of the content of the request. The system may parse the request for the presence of predefined keywords. For example, if the keyword "computer" is contained within the request, the system may associate the "electronics" category with the request automatically. The request for purchase may also optionally include the date or time at which the user desires the request to expire. The potential buyer user creates at least the content of the request for purchase information and, preferably, the format of that information. The communication is then posted to the system. The system includes at least one community of suppliers, such as vendors, that have subscribed to the system and have associated themselves with at least one category designation. Preferably, this at least one category designation is a designation that the potential buyer has also selected. The system associates the buyer's request with the community or communities associated with the category designation(s) selected by the buyer and posts the request (i.e. communication) to a venue that is accessible only by those suppliers that have associated themselves with the at least one category designation that the buyer has associated with his or her request (or the system has suggested or selected on behalf of the potential buyer). Authorized system administrators may have access to all venues without such restriction. (For the sake of clarity, a venue may also be referred to as a traderoom.) In the case where no suppliers have associated themselves with the at least one category designation that the buyer has selected, the communication can still be associated with a venue having a relevant category designation. A supplier subsequently subscribing to the venue would have access to the request if it were still active. This venue provides a repository for all communications from buyers that have associated the category designation with their communications, thereby limiting the communications available to suppliers to those communications having a category designation associated with them that the suppliers have selected as being relevant to their vending of goods and services.

Since the communication is posted only to a venue or venues with which the category designation or category designations in the communication are associated, the communication is accessible only to suppliers that have selected those category designations describing those goods or services. In a preferred embodiment, communication with the present system may occur over a network, such as the Internet, LAN, WAN, peer-to-peer, client-server, wireless, Ethernet, local telephone exchange, interexchange, telecommunications, cable television, broadcast, switched, dedicated, Voice over IP (VoIP), Wi-Fi, or WiMAX network, or a hybrid type of the foregoing networks (or any network similar to the aforementioned networks). Preferably, the system may also be implemented as a user-friendly website to facilitate access by suppliers and potential buyers. Communication between suppliers and potential buyers, including requests and replies, may comprise any electronic communication or message facility, including, for example, direct emails, electronic bulletin board postings, newsgroups messages, electronic forum conversations, or any other form of electronic media or conversation. These communications may be stored in an actively managed, operational, analytic, relational, object-oriented, hierarchical, or hybrid types of databases or other storage mechanisms along with user profiles (including user-names, contact information, passwords, and any other user-supplied or derived information) of users (i.e. potential buyers and suppliers) of the system.

Further, additional classification features can be included that permit additional criteria to be used in associating communications with groups of suppliers. For example, buyers who are required to purchase items or volumes of items from favored categories of suppliers may be provided with additional codes that permit the association of a code with a communication so that the communication is available only to suppliers that have identified themselves with that code.

The system also provides a mechanism for members of a closed user group to publish to or communicate with one another while permitting publishing to or communication with other parties outside the closed user group (and vice versa) based upon a combination codes which identify the group and subscription level of the user.

Content, such as requests, posted by originator-users (such as buyers) is effectively pushed to potential respondents (such as suppliers) who have self-associated themselves with the corresponding content by selecting appropriate category designations. This may be accomplished through the potential respondent subscribing to a venue that is defined by a relevant category designation. A supplier, accessing a venue associated with a category designation that the supplier has subscribed to, is provided only with requests for purchase that have that category designation associated with the requests; therefore, the supplier has access only to requests for purchase from buyers that are: (i) targeted to that category designation; (ii) are actively interested in purchasing goods or services associated with that category designation; and (iii) are currently interested in purchasing as of the date of the creation of the communication. In addition, each communication is available to new supplier users who subscribe to that category designation after the posting. Suppliers that are subscribers at or after the time of posting have access to posted communications. The venue acts as repository for buyer communications so that the initial buyer-to-supplier information flow can be not only real time, but also time-lagged or asynchronous. Each communication is available to new supplier users who subscribe after the posting. The system creates a distinct original "repository" for all original communications, i.e., the "main document" originated by a particular buyer user. By threading, all subsequent communications are based on the original buyer-created communication, thereby eliminating any ambiguity as to the content of the original request for purchase communication.

Each supplier subscriber to a venue, having access to a venue and to the communications associated via category designation to that venue, is able to reply privately and directly to the buyer generating the specific communication. These communications between a supplier user and a buyer user are private to the supplier user and buyer user, although they are threaded to include the original communication that initiated the thread.

With regard to amending or changing a request, the system may be structured to provide for the specific case of amended originator-generated requests, such as RFPs, requiring the originator (buyer user) to withdraw the original request (i.e. communication/document) and to submit a replacement request, such as a resubmitted amended RFP.

Turning now to a preferred embodiment of the present invention, the system centers around a set of message venues, or traderooms. Each venue is defined by the one or more category designations so that requests can be associated with venues that are relevant to the designation(s) and the venue. In effect, the venue's category designation definition becomes descriptive of the category designation(s) of requests that will be posted and associated with the venue, such as category designations descriptive of goods or services that are to be vended through the intermediation of that venue. These category designations are formed into a list of such category designations.

A subscriber to the system, whether originator or potential respondent (for example, buyer or supplier, respectively), identifies a category designation (i.e., a venue) based on the category designations of goods and services that are of interest to the subscriber. The user subscribes for the purpose of initiating or intermediating sales (i.e. buying or vending goods or services) through that venue, thereby causing the system to display all posted communications associated with the category designation(s) defining the venue. (The user may additionally subscribe for the purpose of receiving news or information relating to the category of goods or services defined by the category designation.) To facilitate the subscriber's selection, a search facility is provided for locating and selecting venue(s) based on a match between system category designations and the words used in the subscriber's search query. Or the subscriber may enter descriptors of relevant request content, such as descriptors of goods or services. If such a search is conducted, the identity of the venue or venues having categories responsive to the search are displayed, and the subscriber can select from that returned search result in order to subscribe to that venue. In a similar fashion, the subscriber can unsubscribe from a venue and thereby disable the system mechanism that delivers messages associated with that venue's category.

A buyer user posts a new buy request (communication of request for purchase) by entering a summary of the buy request with specific substantive content, selects one or more subscribed venues (using a search facility if desired) and either enters a user-defined buy request of specific content and format or attaches a previously created buy request of specific content and format. The attachment may be in various document formats, such as (.txt, .rtf, .htm, .html extensions); Microsoft WORD™ format (.doc, .mcw extensions); Microsoft EXCEL™ format (.xls, .xlw extensions); Adobe™ portable document format (.pdf extension); Corel WORD-PERFECT™ format (.wpd extension); or Lotus 1-2-3™ format (.wk1, .wk3, .wk4 extensions), or any other software or file type extension capable of storing data. The attachment may be transferred or uploaded to the system via any available data transfer network facility, including HTTP upload functionality or File Transfer Protocol (FTP) or other like protocols designed to transfer data. A supplier subscriber merely subscribes to one or more venues by selecting the venues based on the categories of goods or services with which each venue is associated thereby activating the system mechanism which delivers content posted to those subscribed venues to the supplier subscriber.

On receipt of a buy request (preferably associated with one or more venues by the self-selection of relevant category designation(s) by the posting buyer), the system posts the communication to each of the venues with which the communication has been associated by category designation. Any supplier subscriber that is subscribed to the associated venue will see the posted communication. Only supplier subscribers to the intermediating venue(s)—and the original poster—are able to see the original poster's communication, except for authorized administrators. In a preferred embodiment, supplier subscribers are notified whenever a communication or request for purchase is posted to a venue to which the supplier subscriber has subscribed.

A reply by a supplier subscriber to a communication of request for purchase (i.e. a sales opportunity) may be made by the supplier subscriber entering a subject as a quick message or by entering a subject and attaching a prepared document and/or entering a reply. Such replies are sent only to the original poster of the sales opportunity. From that point, private, bilateral correspondence can continue between specific supplier subscribers and the original poster. The system organizes sets of such bilateral correspondences as threads originating with the original post. Optionally, a supplier subscriber may provide a supplier profile for themselves as an information guide to buyer users.

Figure 1:
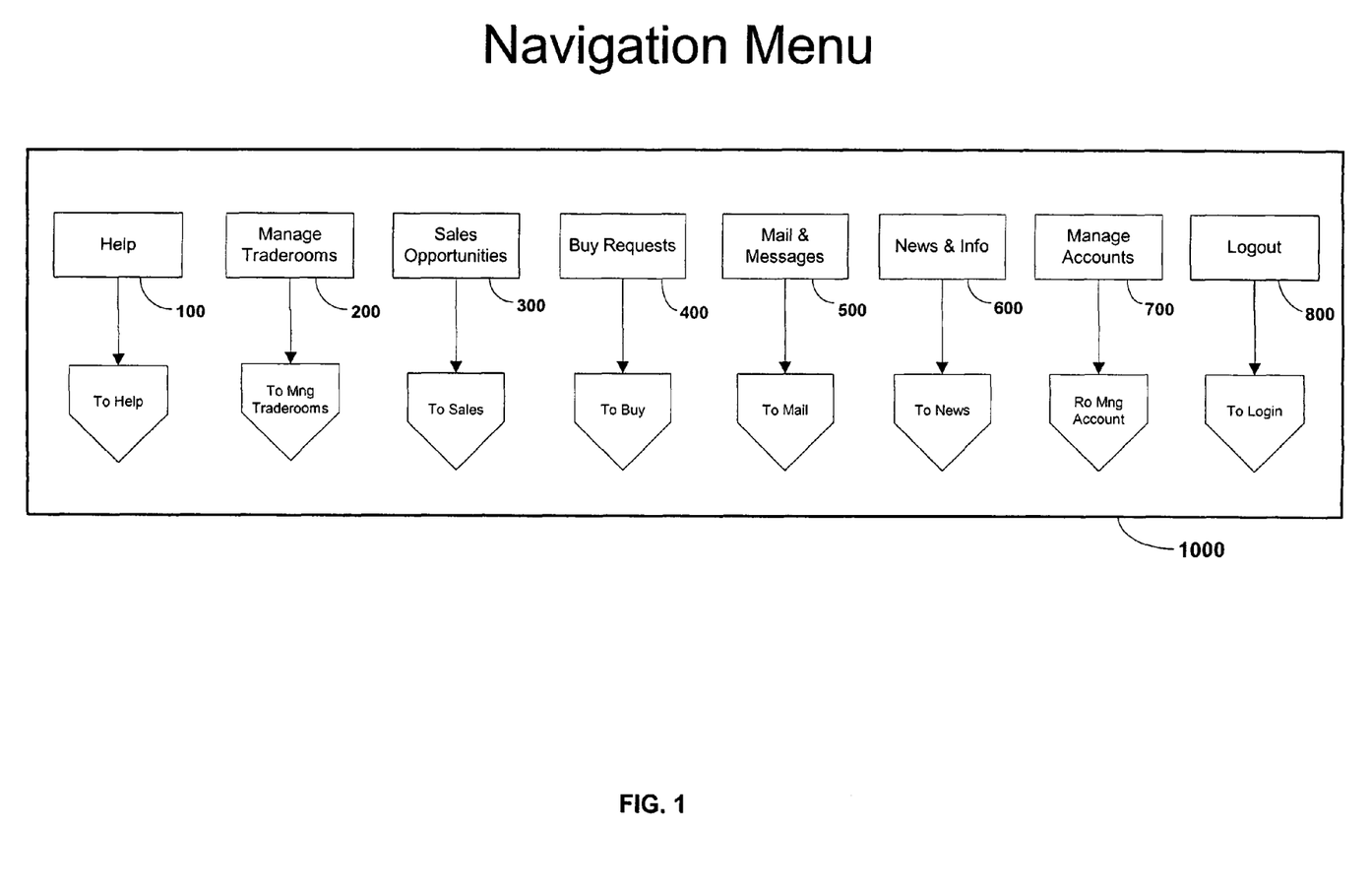
FIG. 1 is a flow chart illustrative of the present invention and including a navigation menu facility.

Turning now to a specific example illustrative of the system of the present invention, and as illustrated in FIGS. 1 through 7, wherein like numerals indicate like elements throughout, a system of the present invention implemented as an automated information system provides a user, upon successfully logging into the system, with a navigation menu 1000 (as illustrated in FIG. 1) that permits the user to select a single choice. Specifically, "Help" 100 takes the user to a help facility. "Managing Traderooms" (venues) 200 takes the user to a facility for managing subscription(s) to traderoom(s) (venue(s)). "Sales Opportunities" 300 takes the user to a facility for viewing sales opportunities. "Buy Requests" 400 takes the user to a facility for managing the user's requests to buy. "Mail & Messages" 500 takes the user to a facility for managing mail and messages. "News & Information" 600 takes the user to a facility for managing news and information. "Manage Accounts" 700 takes the user to a facility for managing the user's account information. "Logout" 800 logs the user out of the system.

Referring to FIG. 1, navigation menu 1000 may comprise an electronic table of contents, a graphical menu, a series of hyperlinks, a series of clickable buttons, or any other navigational menu or clickable menu bar used to navigate and interact with the present system.

Figure 2:
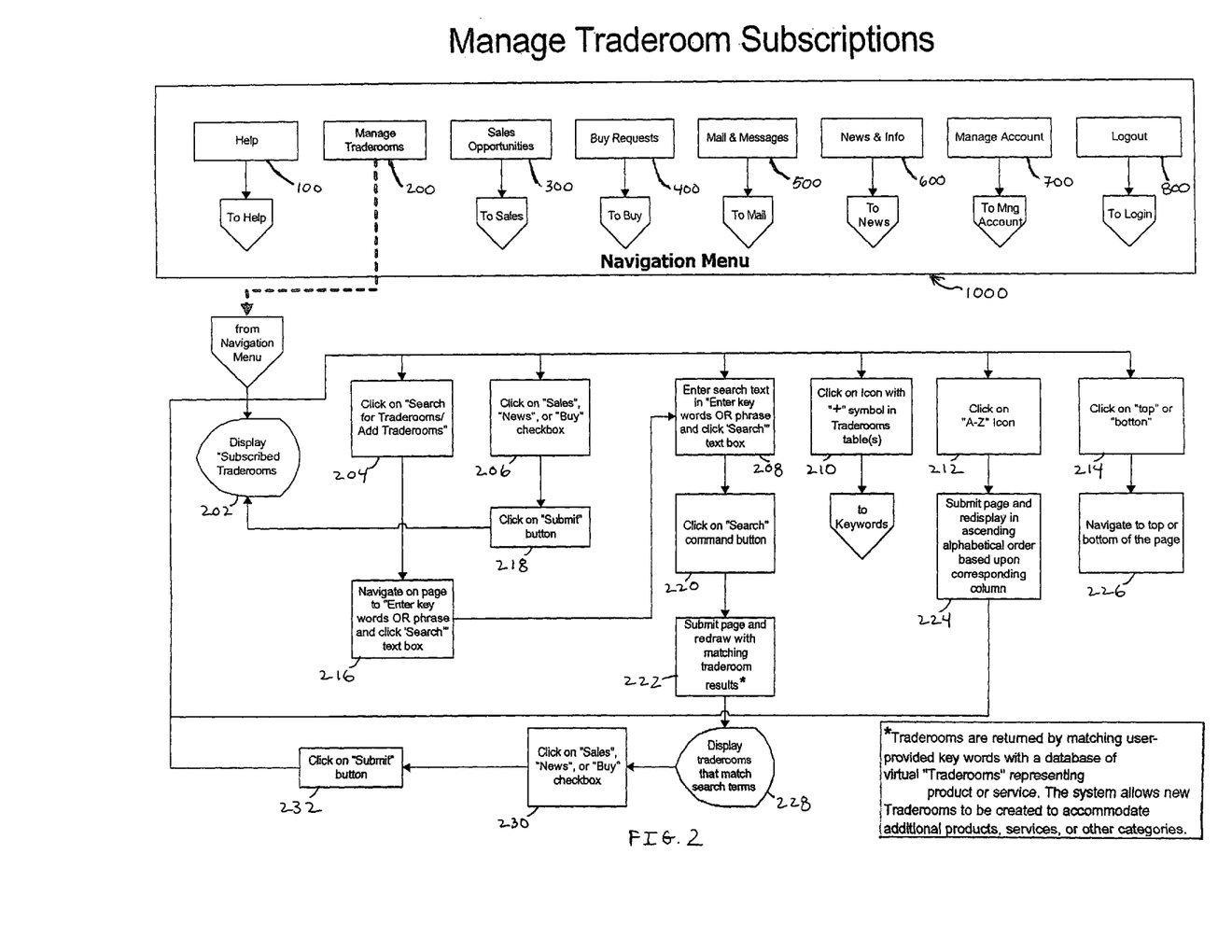
FIG. 2 is a flow chart illustrative of the present invention and including a navigation menu facility and a Manage Traderooms facility.

If the user selects "Manage Traderooms" 200 (as illustrated in FIG. 2), the user is taken to a facility where previously selected Traderooms are displayed and the user may elect to manage his or her subscription to Traderooms (venues) in which case the user may:

(i) select search option 204 to search for Traderooms by first navigating to the search page at navigate stage 216 and entering keywords or phrases to display Traderooms respondent to that search at search text stage 208. After entering keywords or phrases at search text stage 208, the user may click the search command button 220 and the page is submitted to the system at submit stage 222. Matching Traderooms are displayed to the user at results display 228, and the user selects either to view one or more matching Traderoom's sales, buy requests, or news and information at select stage 230. The user's selection is confirmed at submit stage 232;

(ii) select a Traderoom using keywords by clicking on an icon (e.g., a "+" symbol icon) at keywords icon 210. The system displays a table showing the Traderoom display code and all keywords associated with the Traderoom, and the user has the option to subscribe to this Traderoom and all associated Traderooms;

(iii) elect to subscribe to Traderooms for "Sales Opportunities", "Buy Requests" or "News" at stage 206. The user's selection is submitted to the system at submit stage 218 and the user's currently subscribed Traderooms are displayed to the user at Traderoom display 202.

Additionally, the user may have several options to facilitate navigation of the "Manage Traderoom" facility. For example, the user may click on an icon (e.g., a "A-Z" icon) at stage 212 to toggle the "Manage Traderoom" facility between ascending and descending alphabetical order at submit stage 224. Also, the user may click a second icon (e.g., a "Top" or "Bottom" icon) at stage 214 to navigate to the top or bottom of the "Manage Traderoom" facility at stage 226. Traderooms are organized into hierarchies such that, in an alternate embodiment, subscribing to a higher level Traderoom results in subscribing to its associated lower level Traderooms.

Figure 3:
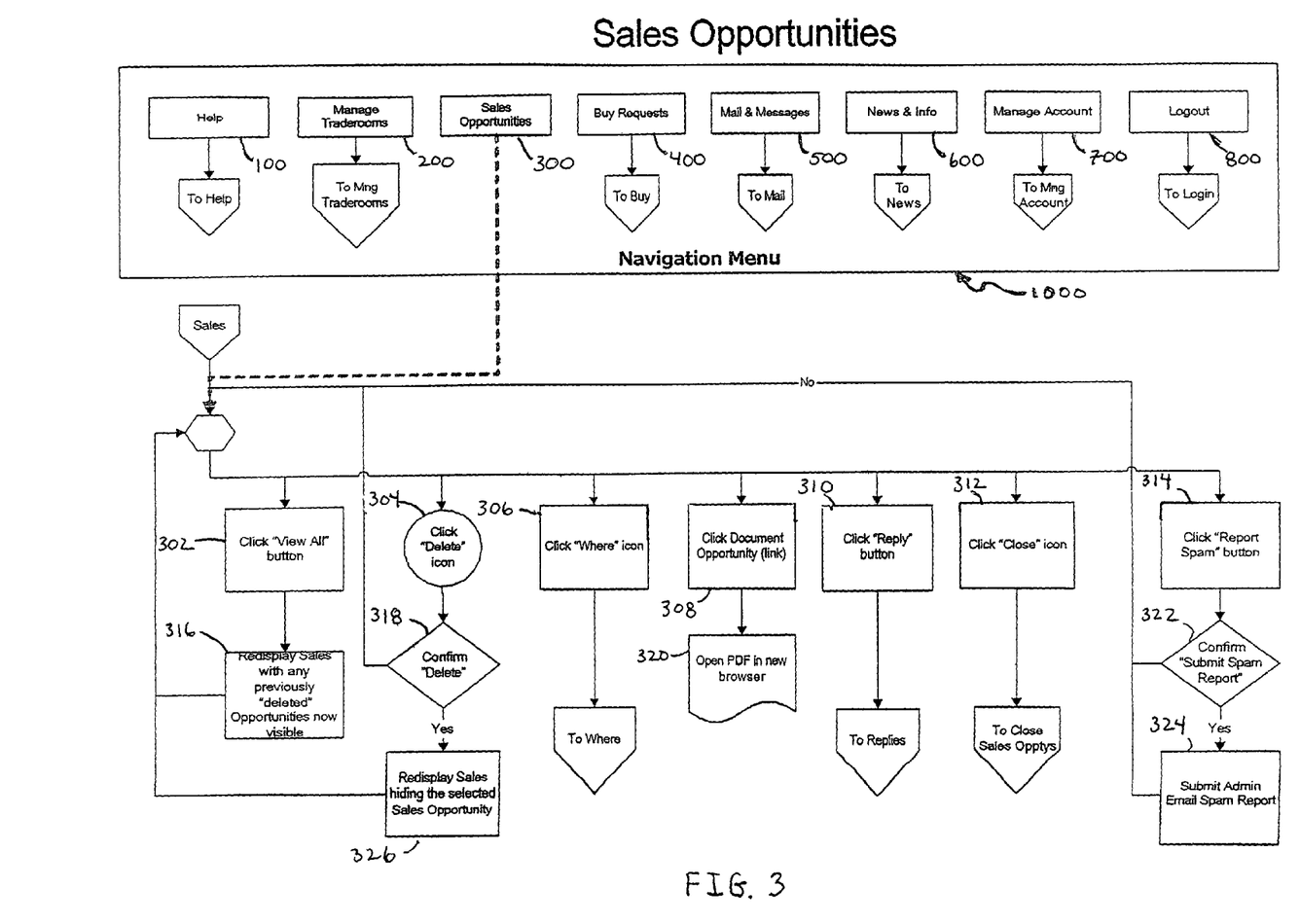
FIG. 3 is a flow chart illustrative of the present invention and including a navigation menu facility and a Sales Opportunities facility.

If the user selects "Sales Opportunities" 300 (as illustrated in FIG. 3), the user is taken to a facility where the user may elect to interact with Sales Opportunities, and the user may:

(i) elect, at view stage 302, to view all Sales Opportunities and the unexpired Sales Opportunities with any previously "deleted" Sales Opportunities being displayed at display 316;

(ii) elect to "delete" a selected Sales Opportunity at delete stage 304, and confirm the deletion at confirmation stage 318, in which case, the selected Sales Opportunity will be hidden from the view of the current user at display 326;

(iii) elect a "Where" facility at stage 306 to see the Traderooms (venues) where the Sales Opportunity is posted and have the option to view the Keywords (category designations) associated with each Traderoom (venue);

(iv) select a detailed view of a Sales Opportunity at document stage 308, in which case a document reflecting a Sales Opportunity may be displayed as a PDF-format document in a new browser window at PDF window 320;

(v) elect a "Reply" facility at reply stage 310 and create a reply message to the specific Sales Opportunity by: (i) entering the subject of the reply message into a text box; (ii) optionally electing to send a "Quick Message" by indicating that the subject contains the entire message; (iii) browsing for a previously prepared file for upload as an attachment to the Reply and/or enter a text message directly into the Reply; and (iv) sending the Reply, in which case the information in the Reply is stored in the system of the present invention. Uploaded attachments in supported formats are converted to PDF format for convenience and uniformity. The Reply is only visible to the subscriber who posted the Reply and the user that posted the original Buy Request;

(vi) elect a "Close" facility at close stage 312 in which the user selects either "sold" or "did not sell" as a result of the Sales Opportunity. If sold, the user can provide the sale price and the name of the customer; if not sold, the user can provide reasons via text entry. If subscribed to the Archiving feature, the user may also elect to receive an archive of the transaction and provide a different e-mail address at which to receive the archive. If Archiving has been subscribed to, the user receives an e-mail containing summary information and the individual posts and messages, preferably as an attachment to the summary; and (vii) report unsolicited or unrelated Sales Opportunities (i.e. spam) at report stage 314. The user is asked to confirm the spam report at confirmation stage 322, and the report is submitted to authorized administrators for review at submit stage 324.

Figure 4:
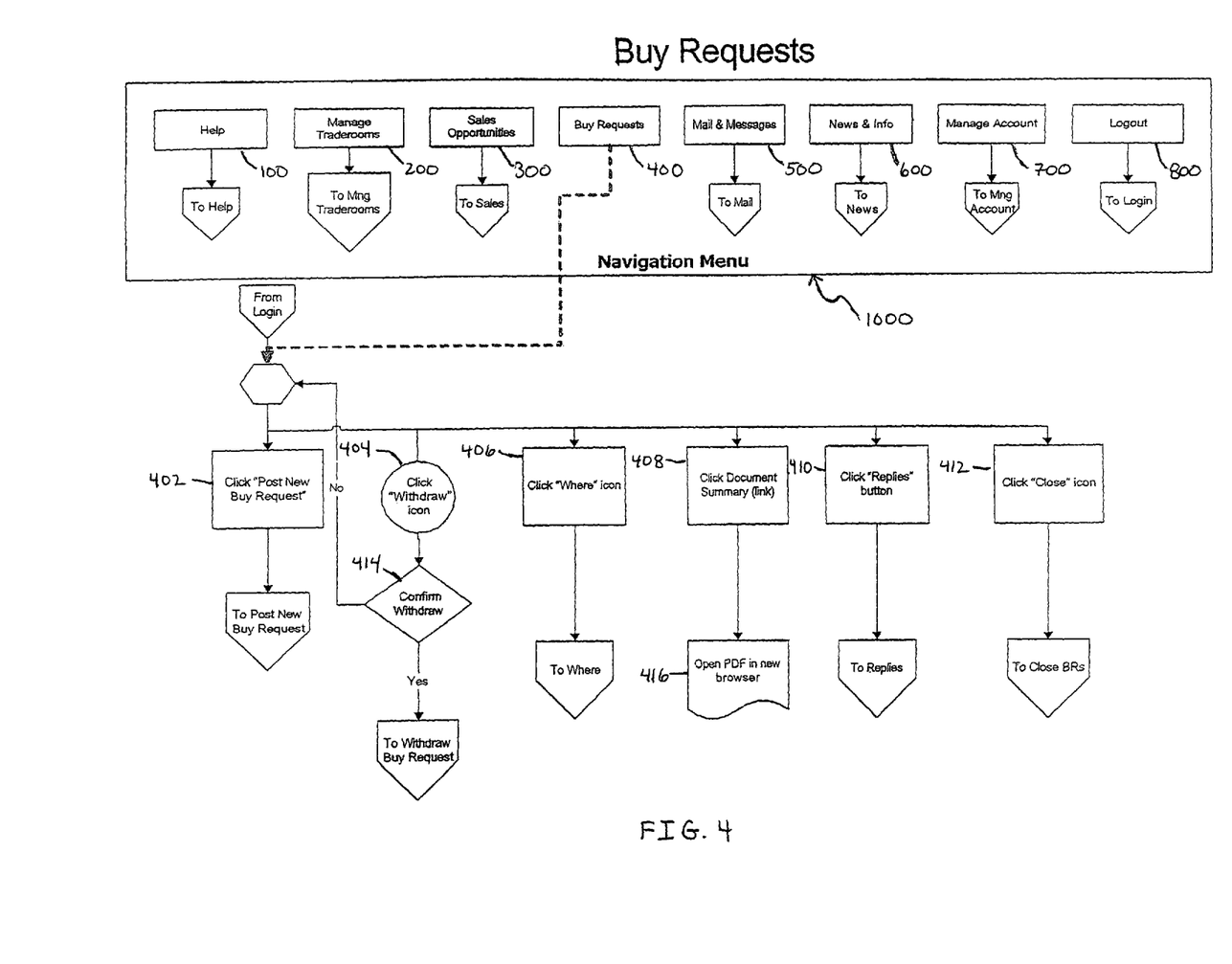
FIG. 4 is a flow chart illustrative of the present invention and including a navigation menu facility and a Buy Requests facility.

If the user selects "Buy Requests" 400 (as illustrated in FIG. 4), the user is taken to a facility where the user may elect to interact with Buy Requests, in which case the user may perform any of the following:

(i) elect to view all unexpired Buy Requests at replies stage 410 and see the date a Buy Request was posted and the date it will expire;

(ii) select a "Where" facility as previously described in connection with a Sales Opportunity by clicking on icon 406;

(iii) select a "Document Summary" at summary stage 408 and view a PDF-format summary document in a new browser window 416; or (iv) elect to post a new buy request at post stage 402. If the user elects to post a new buy request, the user may: (i) enter the subject of the buy request into a text box, optionally electing to check on a "Quick Message" option thereby indicating that the subject contains the entire message/buy request; (ii) select Traderooms previously subscribed to for the Buy Request or search for new Traderooms; (iii) browse for a file the user has previously created for upload as an attachment as a part of the Buy Request or may enter a text message directly as a part of the Buy Request or both; (iv) select the amount of time the Buy Request will remain active; and (v) select one or more Supplier Diversity/Sales Opportunity Filtering categories (if subscribed to Supplier Diversity and/or Sales Opportunity Filtering). Finally, the user may post the Buy Request and the information contained within the Buy Request is stored in the system of the present invention. Preferably, the attachment and remainder of the Buy Request are in PDF format for convenience and uniformity.

(v) elect to withdraw a buy request by clicking on icon 404, in which case the user may: (i) select from among a set of standard reasons for withdrawing the Buy Request; (ii) provide additional reasons for the withdrawal by text entry; and (iii) if subscribed to the Archiving feature, select to receive an archive of the transaction and provide a different e-mail address for delivery of said archive. If Archiving has been subscribed to, the user receives an e-mail containing summary information and the individual posts and messages, preferably as an attachment to the summary. The user confirms the withdrawal at confirmation stage 414;

(vi) elect to close the Buy Request at close stage 412 and the user: (i) selects either a "bought" or a "did not buy" as a result of the Buy Request; (ii) has the option to extend the life of the Buy Request; (iii) can select from among a set of standard reasons the user did not buy; (iv)

can provide an additional reason by entry of text; (v) can enter the purchase price associated with the Buy Request; (vi) sees a list of all suppliers/vendors responding to the Buy Request; and (vii) if subscribed to the Archiving feature, can elect to receive an archive of the transaction and provide a different e-mail address for delivery of the archive.

Figure 5:
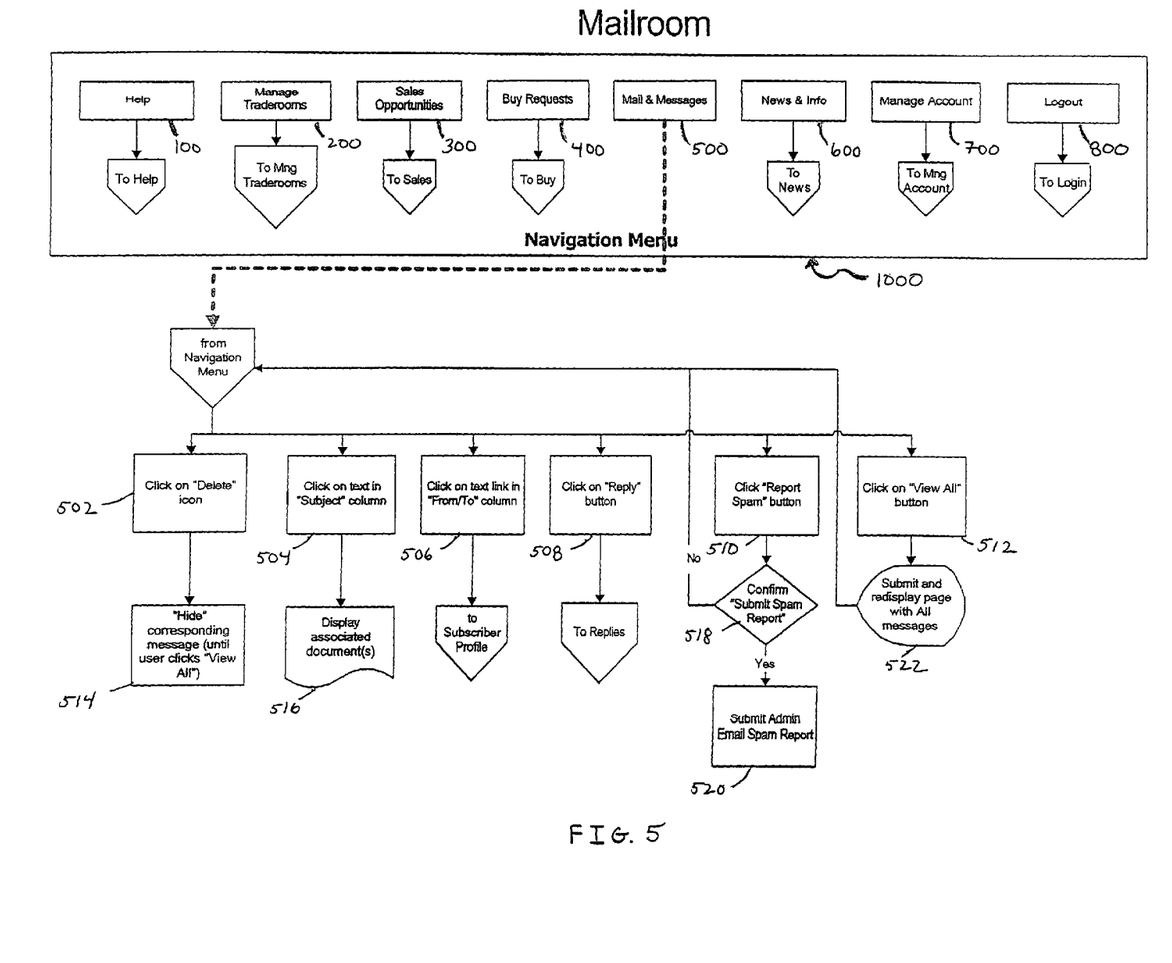
FIG. 5 is a flow chart illustrative of the present invention and including a navigation menu facility and a Mail & Messages facility.

If the user selects "Mail & Messages" 500 (as illustrated in FIG. 5), the user is taken to a facility where the user may elect to manage its mail with respect to the system in which case the user may:

(i) delete a message from view by clicking on delete icon 502. The system may hide the message from view at hide stage 514 until the user elects to view all messages or until the message expires and is removed from the system by the system;

(ii) view a message by clicking on text in the "Subject" column corresponding to the message(s) the user desires to view at view stage 504. The associated message(s) are displayed to the user at display stage 516;

(iii) select a subscriber profile of another user who has sent the user a message by clicking on the text link in the "From/To" column at profile stage 506. This link displays a facility with a summary of subscriber information, including information such as company name, address, email address, telephone number, web site URL, a subscriber-provided text description of the company, a list of Traderooms and Keywords (category designations) that the subscriber has subscribed to for Sales, such as the subscriber's products and services, and an option to view the subscriber's registered certification documents;

(iv) report unsolicited or unrelated messages (i.e. spam) at spam stage 510. The user confirms the spam report at confirmation stage 518, and the report is submitted to authorized administrative personnel at submit stage 520;

(v) view all messages, i.e. display all messages for the current user including those hidden as described above, by clicking on "View All" button 512. The "Mail & Messages" facility is redisplayed with all available messages at redisplay stage 522;

(vi) select a "Reply" facility at reply stage 508 and create a reply message to a received message by: (i) entering the subject of the reply message into a text box; (ii) optionally electing to send a "Quick Message" by indicating that the subject contains the entire message; (iii) browsing for a previously prepared file for upload as an attachment to the Reply or entering a text message directly into the Reply, or both; and (iv) sending the Reply and the information in the Reply, which is stored in the system of the present invention. Optionally, uploaded attachments are converted to PDF format for convenience and uniformity. The Reply is only visible to the subscriber creating the reply and user that posted the original message.

Figure 6:
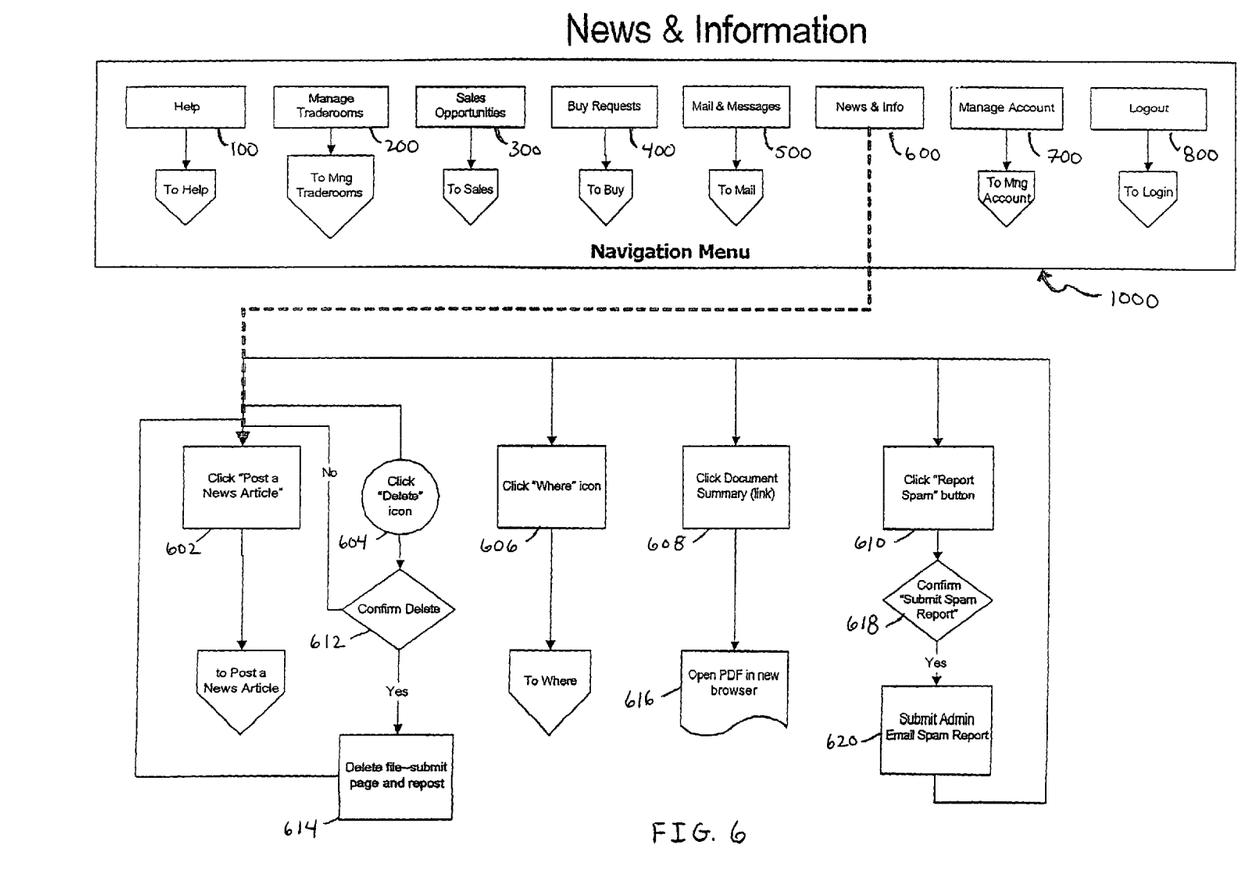
FIG. 6 is a flow chart illustrative of the present invention and including a navigation menu facility and a News & Information facility.

If the user selects "News & Information" 600 (as illustrated in FIG. 6), the user is taken to a facility where the user may elect to manage its news and information with the system in which case the user may:

(i) elect to post a news article at post stage 602 whereby the user is taken to a facility where the news article can be posted by entering a News Article Title, selecting an already subscribed Traderoom or search for new ones, browsing for any accessible file for upload or entering a text message and/or selecting the amount of time the News Article will remain active in the system;

(ii) delete a News Article by clicking on delete icon 604. The user confirms the request for deletion at confirmation stage 612, and the "News & Information" facility is reposted and refreshed at repost stage 614;

(iii) select a "Where" facility (as previously described) by clicking "Where" icon 606;

(iv) click on the news article Title to view the article at summary stage 608. The article is opened in a new window as a PDF file in browser window 616; or (v) report unsolicited or unrelated articles (i.e. spam) at spam stage 610. The user confirms the spam report at confirmation stage 618, and the report is submitted to authorized administrative personnel at submit stage 620.

Figure 7:
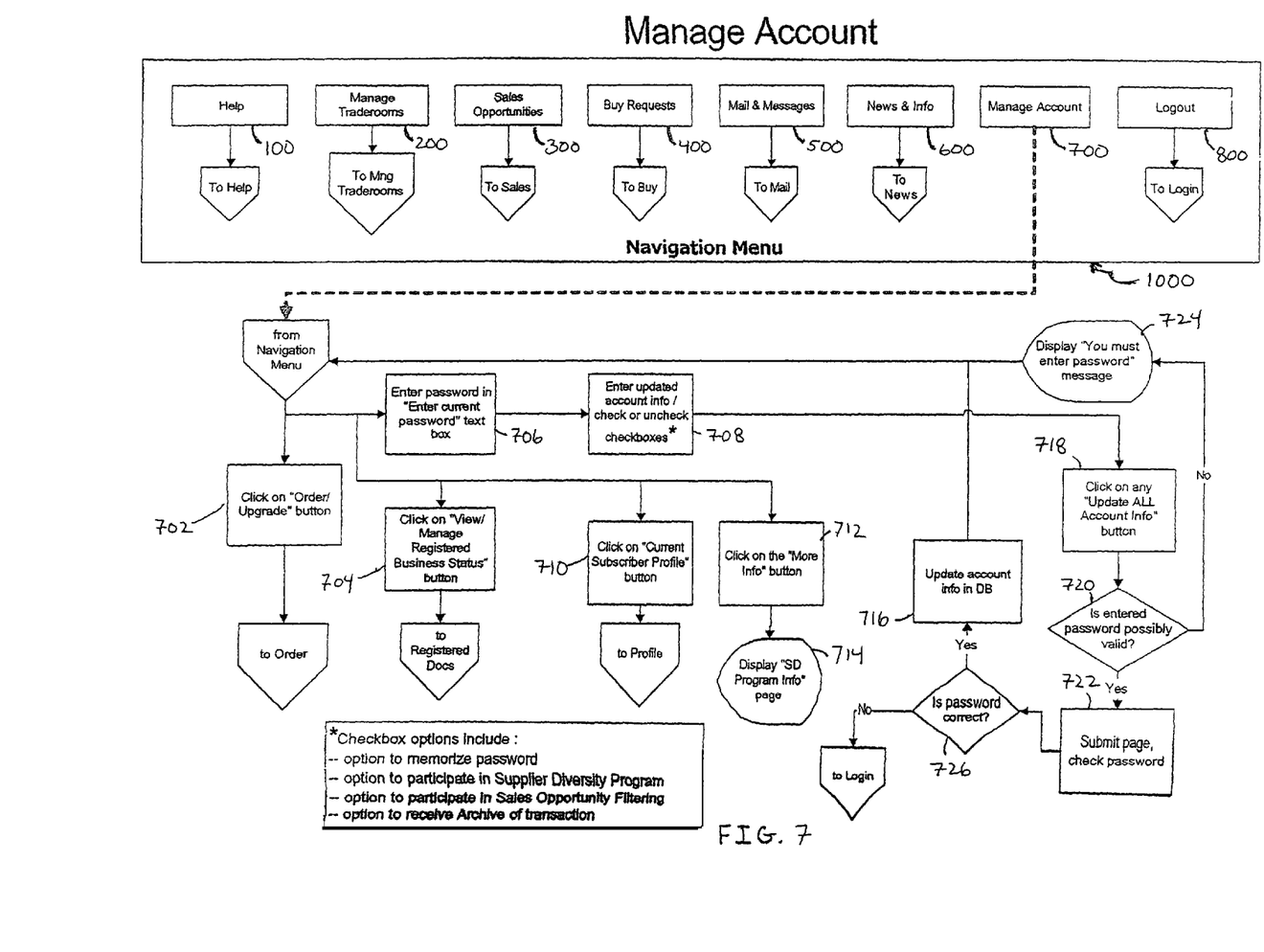
FIG. 7 is a flow chart illustrative of the present invention and including a navigation menu facility and a Manage Account facility.

If the user selects "Manage Account" 700 (as illustrated in FIG. 7), the user is taken to a facility where the user may elect to manage and maintain its account information with the system in which case the user may:

(i) elect to order an upgrade of their subscription to the system by clicking order button 702;

(ii) view or manage their Registered Business Status at status stage 704 under which the user views a table showing their current posted, Registered Business Status certification documents, can view the document by clicking on its title, has an option to withdraw any document if the user is viewing their own Registered Documents page, sees posted date and expiration date for each document and can post new documents if the user is viewing their own Registered Documents page;

(iii) select the user's current subscriber profile by clicking on the "Current Subscriber Profile" button 710;

(iv) elect to view information explaining Special Diversity and/or Sales Opportunity Filtering Programs by clicking on the "Special Diversity" button 712;

(v) elect to participate in the Special Diversity and/or Sales Opportunity Filtering Program at program information stage 714; or (vi) by entering their password at password stage 706, update account information at update stage 708, including password memorization, Supplier Diversity Program and/or Sale Opportunity Filtering participation, or receipt of an Archive of transactions. The user clicks on "Update All" button 718 to update their account information in the system database, at which time the user's password is validated (e.g., passwords may be required to be a minimum length or include both numbers and letters) at validation stage 720. If validation stage 720 is approved, the update page is submitted at submit stage 722 and the inputted password is matched against the user's password in the system at verifications stage 726. If the user's password is not potentially valid at validation stage 720 (e.g., the password field is empty or too short), the password display 724 is presented to the user. At verifications stage 726, if the user's submitted password is correct (i.e. matched with the stored password for the user), the user's account information is modified in the system database at database commit stage 716. If the user's password is not verified at verifications stage 726, the user is prompted to login again.

In the system of the present invention, requests and their associated communications and/or documents, are associated with venues. When posting a Buy Request, the Buy Request document by virtue of the venue associations (i.e. category designation) selected by the poster is associated with the venues. Consequently, the category designation(s) control traffic entering a venue. Users of the system, as a class, are not associated with any particular industry, service, good, or product. This is the inherent flexibility of the system of the present invention and the conceptual device by which the system can be used by virtually any user to communicate with any other user over a virtually unlimited range of category designation concepts. Supplier subscribers may select any venues/category designations (except where limited by other system features such as group memberships), indicating interest in those venues and associated goods and services. Although this associates a set of goods and services with the supplier subscriber which may be viewed in the Subscriber Profile, it does not define or limit the supplier subscriber; i.e. subscriber selections for venues relating to Sales Opportunities may not be construed to fully define or limit the user. Venue selections are fluid and flexible and may be changed by users from moment to moment. Transactions may or may not be consummated within the system. The requestor/prospective buyer may remain anonymous on initial posting, but loses anonymity on posting a reply to a supplier reply.

From the foregoing description of the preferred embodiments, which embodiments have been set forth in considerable detail for the purpose of making a complete disclosure of the present invention, it can be seen that the present invention comprises a system for associating requests with potential respondents to those requests, such as for use in potential purchasing of goods and/or services, knowledge-based inquiries, and matching common interest groups. It will be appreciated by those skilled in the art that changes could be made to the embodiment described above without departing from the broad inventive concept thereof. It is understood, therefore, that this invention is not limited to the particular embodiment disclosed, but it is intended to cover all modifications that are within the scope and spirit of the invention as defined by the appended claims.

What is claimed is:

1. A system for associating an electronic request with at least one supplier, comprising:
    a storage device for storing information regarding a plurality of suppliers of a good or goods, a service or services, for storing information regarding an electronic request of a user, for storing information regarding at least one category designation associated with the electronic request, and for storing information regarding an electronic venue associated with the electronic request;
    a receiver for receiving information regarding the electronic request and for receiving information regarding associating at least one supplier to the electronic venue, wherein the electronic request is transmitted to the receiver from a first communication device of or associated with the user via a first communication network, and wherein the at least one supplier self-selecting the venue to associate with the at least one supplier, wherein the electronic request identifies at least one good or service that is associated with at least one category designation;
    a processor for processing information regarding the electronic request and generating or creating an electronic venue associated with the electronic request and associated with a category designation associated with the electronic request, and for associating the electronic venue associated with the electronic request with at least one of the first or second supplier, and for analyzing content in the electronic request to determine whether the content contains at least one keyword, wherein the at least one keyword is associated with the at least one category designation, wherein the content is analyzed when the electronic request is not assigned by the user to the at least one category designation, and wherein the electronic request is assigned to the at least one category designation when the electronic request contains the at least one keyword that is associated with the at least one category designation;
    a transmitter for transmitting information regarding the electronic request to a second communication device and for transmitting information regarding the electronic request to a third communication device, wherein the second communication device is associated with the first supplier of the plurality of suppliers and the third communication device is associated with the second supplier of the plurality of suppliers,
    wherein the system receives a first request to access the electronic venue by the first supplier, wherein the first request is transmitted to the system via the first communication network or via a second communication network,
    wherein the system processes information contained in the first request, and if the system determines that the first supplier is authorized to access the electronic venue, the system provides the first supplier with access to the electronic venue and with access to the electronic request, and transmits, via the transmitter, information regarding the electronic request to the second communication device, and
    further wherein the system receives a second request to access the electronic venue by the second supplier, wherein the second request is transmitted to the system via the first communication network or via the second communication network,
    wherein the system processes information contained in the second request, and if the system determines that the second supplier is authorized to access the electronic venue, the system provides the second supplier with access to the electronic venue and with access to the electronic request, and transmits, via the transmitter, information regarding the electronic request to the third communication device.

2. A system as recited in claim 1 wherein each of the first and the second communication network comprises the Internet.

3. A system as recited in claim 1 wherein the electronic request includes information regarding the category designation.

4. A system as recited in claim 1 wherein the system or the processor processes information for associating the electronic request with the category designation.

5. A system as recited in claim 1 wherein the system facilitates a communication between the first supplier and the user or the system facilitates a communication between the second supplier and the user.

6. A system as recited in claim 1 wherein the system facilitates a communication from the user to the first supplier or the system facilitates a communication from the user to the second supplier.

7. A system as recited in claim 1 wherein the system processes information for restricting access to the electronic request or for restricting access to the electronic venue to a supplier or to suppliers of the plurality of suppliers associated with a self-selected category designation, wherein the self-selected category designation is the category designation associated with the electronic request.

8. A system as recited in claim 1 wherein the electronic venue contains a communication transmission to be accessible to the user or accessible to the plurality of suppliers.

9. A system as recited in claim 1 wherein the system includes a facility for restricting access to the electronic request to at least one respondent supplier who is authorized to access the venue.

10. A system as recited in claim 1 wherein the system facilitates a near real-time communication between the user and the first supplier or the system facilitates a near real-time communication between the user and the second supplier.

11. A system as recited in claim 1 wherein the system facilitates an asynchronous communication between the user and the first supplier or the system facilitates an asynchronous communication between the user and the second supplier.

12. A system as recited in claim 1 wherein the system facilitates or creates a threaded communication between the user and the first supplier or the system facilitates or creates a threaded communication between the user and the second supplier based upon the original communication.

13. A system as recited in claim 1 wherein the system restricts access to communications between the user and the first supplier or the system restricts access to communication between the user and the second supplier.

14. A system as recited in claim 1 wherein the system provides the user to access all communications between the user and the first supplier or communications between the user and the second supplier, and further wherein the system provides the first supplier or the second supplier to access communications between the first supplier or the second supplier and the user.

15. A system as recited in claim 1 wherein the system facilitates modifying the electronic request, withdrawing the electronic request, or closing the electronic request.

16. A system as recited in claim 1 wherein the system processes information for searching the electronic request, for searching reply or replies, or for searching venue or venues.

17. A system as recited in claim 1 wherein the system processes information for unsubscribing the user or a second user, or the system processes information for unsubscribing any of the plurality of suppliers from the electronic venue.

18. A system as recited in claim 1 wherein the system processes information for notifying the first supplier that a communication has been posted to the electronic venue or a second electronic venue that the first supplier is authorized to access, for notifying the second supplier that a communication has been posted to the electronic venue or the second electronic venue that the second supplier is authorized to access.

19. A system as recited in claim 1 wherein the electronic request contains a short message, short messages, short messages and text attachments, or short messages and document attachments.

20. A system as recited in claim 1 wherein a reply to the electronic request contains a short message, short messages, short messages and text attachments, or short messages and document attachments.

21. A system as recited in claim 1 wherein the system stores information regarding a user profile.

22. A system as recited in claim 1 wherein the system transmits information in a standard viewing format or the system provides information in a standard viewing format.

23. A system as recited in claim 1 wherein the system transmits information regarding an archive record of a communications thread associated with the electronic request.

24. A system as recited in claim 1 wherein the system transmits information regarding an archive of a communications thread between the user and the first supplier or transmits information regarding an archive of a communications thread between the user and the second supplier.

25. A system as recited in claim 1 wherein the system includes a facility for displaying a list of the plurality of respondent suppliers to the at least one electronic request.

26. A system as recited in claim 1 wherein the system processes information for permitting the user to remain anonymous when the electronic request is received by the system.

27. A system as recited in claim 1 wherein the system processes information for removing user anonymity upon posting of a response or a reply to the electronic request.

28. A system for associating requests, comprising:
a receiver for receiving information regarding an electronic request, and for receiving information regarding a plurality of respondent suppliers and for receiving information regarding associating at least one supplier to the electronic venue, wherein said information regarding said electronic request is transmitted from a first communication device of or associated with a user of good or goods or service or services, and wherein said electronic request identifies at least one good or service that is associated with at least one category designation;
a storage device for storing said information regarding said electronic request, wherein said storage device stores information in a venue associated with said storage device; and
a processor for associating at least one category designation with said information regarding said electronic request and for associating said electronic venue with said electronic request, wherein said at least one category designation is selected from a plurality of category designations created by said processor, and for providing said at least one potential supplier of said good or goods or service or services with access to said electronic request based on said at least one category designation, each said at least one potential respondent supplier having self-selected said at least one category designation for association with itself, and wherein said request is accessible by said at least one potential respondent supplier who subscribes to said at least one category designation, wherein said processor analyzes content in said electronic request to determine whether said content contains at least one keyword, wherein said at least one keyword is associated with said at least one category designation, and wherein said content is analyzed when said electronic request is not assigned by said user to said at least one category designation, and wherein said electronic request is assigned to said at least one category designation when said electronic request contains said at least one keyword that is associated with said at least one category designation; and
said system for posting said electronic request to a venue, said venue being associated with said at least one category designation and associated with said electronic request; and
wherein said system user and said at least one potential respondent supplier access said system over a network; and
wherein said system receives information regarding authorizing at least one potential respondent supplier of said plurality of potential respondent suppliers to access said venue, and further wherein said information regarding authorizing said at least one potential respondent supplier is transmitted from a second communication device of or associated with said at least one potential respondent supplier, and wherein said system determines whether said at least one potential respondent supplier is authorized to access said venue to retrieve said information regarding said electronic request, wherein said at least one potential respondent supplier is authorized to access said venue if said at least one potential respondent supplier is associated with said at least one category designation, wherein said system includes a facility for permitting said user to define a content and a format of said electronic request.

29. A system as recited in claim 28 wherein said network comprises the Internet.

30. A system as recited in claim 28 wherein said user selects said at least one category designation for association with said electronic request.

31. A system as recited in claim 28 wherein said system selects said at least one category designation for association with said electronic request.

32. A system as recited in claim 28 wherein the system facilitates communication between said at least one respondent supplier and said user originating said electronic request.

33. A system as recited in claim 28 wherein the system facilitates the user originating said electronic request to see all responses in a single thread and facilitates at least one respondent supplier to only see communications between the user originating a request and said at least one respondent supplier.

34. A computer-implemented method, comprising:

storing information in a storage device regarding a plurality of suppliers of a good, goods, a service, or services, for storing information regarding an electronic request of a user, for storing information regarding at least one category designation associated with the electronic request, for storing information for creating an electronic venue associated with the electronic request and associated with the at least one category designation, wherein information regarding the electronic request is capable of being provided to each of the plurality of suppliers via the electronic venue, and for storing information for determining whether or not at least one supplier of the plurality of suppliers is allowed to access the electronic venue;

receiving the electronic request with a receiver and for receiving information regarding associating at least one supplier to the electronic venue, wherein the electronic request is transmitted to the receiver from a first communication device of or associated with the user via a first communication network;

processing, with a processor, information regarding the electronic request, wherein the processor analyzes content in the electronic request to determine whether the content contains at least one keyword, wherein the at least one keyword is associated with the at least one category designation, and wherein the content is analyzed when the electronic request is not assigned by the user to the at least one category designation, and wherein the electronic request is assigned to the at least one category designation when the electronic request contains the at least one keyword that is associated with the at least one category designation;

generating or creating an electronic venue associated with the electronic request and associated with a category designation associated with the electronic request;

receiving a first request to access the electronic venue by a first at least one supplier of the plurality of suppliers, wherein the first request to access the electronic venue is transmitted via the first communication network or via a second communication network;

processing information contained in the first request to access the electronic venue or processing information regarding the first at least one supplier of the plurality of suppliers;

determining whether or not the first at least one supplier of the plurality of suppliers is authorized to access the electronic venue and, if the first at least one supplier of the plurality of suppliers is authorized to access the electronic venue, providing the first at least one supplier of the plurality of suppliers with access to the electronic venue and with access to the electronic request;

transmitting information regarding the electronic request to the second communication device;

receiving a second request to access the electronic venue by a second at least one supplier of the plurality of suppliers, wherein the second request to access the electronic venue is transmitted to the system via the first communication network or via the second communication network;

processing information contained in the second request to access the electronic venue or processing information regarding the second at least one supplier of the plurality of suppliers;

determining whether or not the second at least one supplier of the plurality of suppliers is authorized to access the electronic venue and, if the second at least one supplier of the plurality of suppliers is authorized to access the electronic venue, providing the second at least one supplier of the plurality of suppliers with access to the electronic venue and with access to the electronic request; and transmitting information regarding the electronic request to the third communication device.

35. The computer-implemented method of claim 34, further comprising:

receiving a response or a reply to the electronic request by the first at least one supplier of the plurality of suppliers or receiving a response or a reply to the electronic request by the second at least one supplier of the plurality of suppliers.

* * * * *